United States Patent [19]

Zabrocki

[11] Patent Number: 4,883,837

[45] Date of Patent: Nov. 28, 1989

[54] COMPATIBLE BLENDS OF POLYOLEFINS WITH THERMOPLASTIC POLYURETHANES

[75] Inventor: Vincent S. Zabrocki, Newark, Ohio

[73] Assignee: The Dow Chemical Company, Midland, Mich.

[21] Appl. No.: 211,190

[22] Filed: Jun. 24, 1988

[51] Int. Cl.$^4$ .............................................. C08L 75/04
[52] U.S. Cl. ...................................... 525/66; 525/125
[58] Field of Search ............................. 525/66, 125, 92

[56] References Cited

U.S. PATENT DOCUMENTS

| | | | |
|---|---|---|---|
| 3,272,890 | 9/1966 | O'Leary | 260/859 |
| 3,310,604 | 3/1967 | Steingiser et al. | 260/859 |
| 3,351,676 | 11/1967 | Saunders et al. | 260/859 |
| 3,358,052 | 12/1967 | Archer, Jr. et al. | 260/859 |
| 3,929,928 | 12/1975 | Wolf, Jr. et al. | 260/859 R |
| 4,410,595 | 10/1983 | Matsumoto et al. | 428/412 |
| 4,423,185 | 12/1983 | Matsumoto et al. | 525/66 |
| 4,525,405 | 6/1985 | McKinney et al. | 428/95 |

FOREIGN PATENT DOCUMENTS 749831 3/1974 Japan.

Primary Examiner—Lewis T. Jacobs
Assistant Examiner—A. Carrillo
Attorney, Agent, or Firm—James S. Rose

[57] ABSTRACT

Disclosed are novel thermoplastic compatible compositions comprising a polyolefin, a thermoplastic polyurethane, and a compatibilizing amount of at least one modified polyolefin.

The polymer blends are soft, flexible, resinous compositions of high tensile and tear strengths. The compositions overcome the barrier of incompatibility between polyethylene and thermoplastic polyurethanes.

16 Claims, No Drawings

COMPATIBLE BLENDS OF POLYOLEFINS WITH THERMOPLASTIC POLYURETHANES

FIELD OF THE INVENTION

This invention relates to thermoplastic resinous compositions and is more particularly concerned with compatible blends of polyolefins with thermoplastic polyurethanes and a compatibilizing proportion of a modified polyolefin.

DESCRIPTION OF THE PRIOR ART

The blending of polyolefins such as polyethylene or polypropylene with thermoplastic polyurethanes has been a long sought endeavor. If nothing else, one of the primary goals has been the availability of economically attractive polymer blends with properties close or equal to the best of the polyurethane components. Unfortunately, it has long been observed that polyurethanes and polyolefins, with polyethylene in particular, are largely incompatible except at the lowest levels of one in the other. Quite obviously, such incompatibility results in their so-called delamination or separation when formed into molded articles or films which results in very poor physical properties.

U.S. Pat. No. 3,272,890 discloses blends of basically 15 to 25 weight percent of polyurethane in polyethylene. This is achieved by first melting and fluxing the polyethylene in a Banbury mixer to which is added the polyurethane. In a series of U.S. Pat. Nos. 3,310,604; 3,351,676; and 3,358,052, there is disclosed polyurethanes having dispersed therein 0.2 to 5 weight percent polyethylene.

U.S. Pat. No. 3,929,928 teaches that blends of 80:20 to 20:80 weight ratio of chlorinated polyethylenes with polyurethanes and containing 1 to 10 pph of polyethylene result in improved processability, particularly in the manufacture of films or sheets by milling or calendering. Such blends are more economical than the polyurethane alone.

U.S. Pat. Nos. 4,410,595 and 4,423,185 disclose soft resinous compositions containing 5 to 70 weight percent thermoplastic polyurethanes and 30 to 95 percent of polyolefins modified with functional groups such as carboxyl, carboxylic acid anhydride, carboxylate salt, hydroxyl, and epoxy. One of the features of the disclosed blends is their adhesion to other polymeric substances such as polyvinyl chloride, acrylic resins, polystyrenes, polyacrylonitriles, and the like. This property leads to their prime utility in the coextrusion, extrusion coating, extrusion laminating, and the like of polymer laminates.

U.S. Pat. No. 4,525,405 discloses polyurethane polymer forming compositions consisting of polyols, polyisocyanates, and catalysts which compositions also contain at least one thermoplastic polymer such as chlorinated polyethylene, polyethylenes, polyethylene vinyl acetate and mixtures thereof. The disclosed compositions are employed to form a polyurethane secondary carpet backing on a primary synthetic backing having the carpet fibers tufted therein. This prevents an edge curl problem in the resulting carpets.

Japanese patent application 74 9831 (Derwent Abstract 24216V) discloses modified ionomer polymer blends for wire insulation. The modified blends contain predominantly the ionomer component with minor proportions of polyurethane and polyethylene.

There still remains the need for thermoplastic polyurethane/polyolefin compatible blends wherein the latter component forms a substantial proportion and the resultant polymer products have good physical properties.

SUMMARY OF THE INVENTION

This invention is directed to thermoplastic compatible compositions comprising (A) a polyolefin, (B) a thermoplastic polyurethane, and a compatibilizing amount of (C) at least one modified polyolefin.

The term "polyolefin" means polyethylene inclusive of high density polyethylene (HDPE), low density polyethylene (LDPE), linear low density polyethylene (LLDPE), polypropylene, polybutylene, copolymers of ethylene/propylene, ethylene/butylene, propylene/butylene, and the like.

The term "compatibilizing amount" as used herein means an amount sufficient to cause the polyolefin and polyurethane to mix together without objectionable separation so that delamination or derivation problems do not occur in the resulting thermally formed products such as molded, extruded, or film formed parts as described below.

The term "modified polyolefin" means a random, block, or graft olefin copolymer having in a main or side chain thereof a functional group such as carboxylic acid; $C_1$ to $C_8$ carboxylate ester such as carbomethoxy, carbethoxy, carbopropoxy, carbobutoxy, carbopentoxy, carbohexoxy, carboheptoxy, carboctoxy, and isomeric forms thereof; carboxylic acid anhydride; carboxylate salts formed from the neutralization of carboxylic acid group(s) with metal ions from Groups I, II, III, IV-A, and VIII of the periodic table, illustratively including sodium, potassium, lithium, magnesium, calcium, iron, nickel, zinc, and aluminum, and mixtures thereof;, amide; epoxy; hydroxy; $C_2$ to $C_6$ acyloxy such as acetoxy, propionyloxy, butyryloxy, and the like; wherein said functional group is part of an unsaturated monomer precursor which is either copolymerized with an olefin monomer or grafted onto a polyolefin to form said modified polyolefin.

This invention is also directed to molded articles and particularly films prepared from the thermoplastic compositions defined above.

The blends of the invention succeed in achieving the mutual compatibility of the high proportions of polyolefin, particularly polyethylene, with thermoplastic polyurethanes which heretofore have not been possible. Generally speaking, the blends maintain excellent physical properties from both components. Surprisingly, in some cases the blends enjoy a synergistic benefit in properties which will be discussed in detail below.

DETAILED DESCRIPTION OF THE INVENTION

The blends in accordance with the present invention are readily prepared either by initially dry-blending the components followed by fluxing the mixture using any of the known means for dry-blending and/or melt-compounding solids. It will be readily apparent to one skilled in the art that such blends, of necessity, must be thoroughly fused in any molding or film forming operation and it is in this fused blend that the resulting mixture reaches its maximum physical properties. Illustratively, the three components in pelletized, flake, or otherwise comminuted form can be brought together and dry-blended using conventional means such as a barrel mixer, tumble mixer, rubber mill, Henschel mixer, Banbury mixer, and the like. The pre-mixed components can then be compounded or fluxed in an appropriate melt-extruder, the Banbury mixer or rubber mill run at elevated temperatures, twin-screw compounders, and the like. Conveniently, the mixing and melt-blending may be carried out all in one step by bringing the components together directly in a melt-compounding apparatus inclusive of single and twin-screw extruders, or Brabender mixers and producing strand, sheet, rope, film, and the like. The homogeneous blend can then be chopped, pelletized, or comminuted prior to any subsequent shaping or forming steps. The compounding or fluxing temperature is not critical except to the extent that the three components must be fused together but not thermally degraded. Advantageously, the blending temperature can fall within a range of from about 125° C. to about 325° C., preferably from about 150° C. to about 225° C.

The novelty in the present blends resides in the choice of the modified polyolefin (C) to compatibilize the polyolefin (A) component together with the thermoplastic polyurethane (B). The proportions in which the components are employed will be governed largely by the concentration of polyolefin used and choice of compatibilizer. For any given combination the minimum amount of (C) necessary for compatibility as defined above is readily determined simply by increasing its proportion in the blend until delamination no longer is evident in a molded or formed part. The term "delamination" as used herein means a separation of polymer blend components in a molded part as evidenced either by the lowering of some measured physical property (e.g. tensile strength) to a value below that for either one of the components; or the visual observation of separation such as sample fracture, crumbling, and the like. It will be understood that a molded part refers to one made by compression molding, injection molding, extrusion, film, and fiber formation, and the like.

Advantageously, the blends comprise from about 15 to about 70 weight percent polyolefin, from about 20 to about 80 weight percent thermoplastic polyurethane, and from about 5 to about 50 weight percent of modified polyolefin based on a total composition weight percent of 100. Preferably, the proportions are from about 15 to about 60, from about 30 to about 70, and from about 10 to about 35 weight percent, respectively, and more preferably 15 to 30, 50 to 70, and 15 to 25 percent, respectively.

Broadly speaking, the polyolefin component is defined above to include the various types of polyethylenes and polypropylenes, polybutylenes, and the well-known copolymers thereof. While the polyolefins other than polyethylenes can provide blends in accordance with the present invention, it is the polyethylenes which are the preferred group. Included in the polyethylenes are the HDPE materials made polymerizing ethylene using so-called Ziegler-Natta coordination catalysts to provide linear (non-branched) high density polyethylenes (densities=0.941 to 0.965 gms/cc); LDPE materials made by polymerizing ethylene using free-radical catalysts under high pressures and high temperatures to provide branched polyethylenes (densities=0.910 to 0.935 gms/cc); the LLDPE materials prepared from ethylene and minor amounts of alpha, beta-ethylenically unsaturated $C_3$ to $C_{12}$ alkenes under Ziegler-Natta conditions to provide essentially linear low density polyethylenes but with alkyl side chains from the α-olefin components (densities=0.88 to 0.935 gms/cc); and the ULDPE (ultra low density polyethylenes) which are essentially identical to the LLDPE materials. For a teaching on the various types of polyethylenes and their preparations reference is made to U.S. Pat. No. 4,684,576 and the references included therein which disclosures are incorporated by reference herein.

Preferred within this polyethylene group are the softer more elastic polyethylenes such as the low density and linear low density polyethylenes with the latter most preferred.

The polyurethane component has no limitation in respect of its formulation other than the requirement that it be thermoplastic in nature which means it is prepared from substantially difunctional ingredients, i.e. organic diisocyanates and components being substantially difunctional in active hydrogen containing groups. However, oftentimes minor proportions of ingredients with functionalities higher than two may be employed. This is particularly true when using extenders such as glycerin, trimethylolpropane, and the like. Such thermoplastic polyurethane compositions are generally referred to as TPU materials. Accordingly, any of the TPU materials known in the art can be employed in the present blends. For representative teaching on the preparation of TPU materials see Polyurethanes: Chemistry and Technology, Part II, Saunders and Frisch, 1964 pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; and 4,631,329 whose disclosures are hereby incorporated herein by reference.

The preferred TPU is a polymer prepared from a mixture comprising an organic diisocyanate, at least one polymeric diol and at least one difunctional extender. The TPU may be prepared by the prepolymer, quasi-prepolymer, or one-shot methods in accordance with the methods described in the incorporated references above.

Any of the organic diisocyanates previously employed in TPU preparation can be employed including aromatic, aliphatic, and cycloaliphatic diisocyanates, and mixtures thereof.

Illustrative isocyanates but non-limiting thereof are methylenebis(phenyl isocyanate) including the 4,4'-isomer, the 2,4'-isomer and mixtures thereof, m- and p-phenylene diisocyanates, chlorophenylene diisocyanates, α,α'-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate and the like; cycloaliphatic diisocyanates such as methylenebis(cyclohexyl isocyanate) including the 4,4'-isomer, the 2,4'-isomer and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, and all geometric isomers and mixtures thereof and the like. Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347. The modified methylenebis(phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired.

Preferred classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis(cyclohexyl isocyanate) inclusive of the isomers described above.

The polymeric diols which can be used are those conventionally employed in the art for the preparation of TPU elastomers. The polymeric diols are responsible for the formation of soft segments in the resulting polymer and advantageously have molecular weights (number average) falling in the range of 400 to 4,000, and, preferably 500 to 3,000. It is not unusual, and, in some cases, it can be advantageous to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with amine-terminated polyethers and amino-terminated polybutadiene-acrylonitrile copolymers.

Illustrative of polyether polyols are polyoxyethylene glycols, polyoxypropylene glycols which, optionally, have been capped with ethylene oxide residues, random and block copolymers of ethylene oxide and propylene oxide; polytetramethylene glycol, random and block copolymers of tetrahydrofuran and ethylene oxide and or propylene oxide, and products derived from any of the above reaction with di-functional carboxylic acids or esters derived from said acids in which latter case ester interchange occurs and the esterifying radicals are replaced by polyether glycol radicals. The preferred polyether polyols are random and block copolymers of ethylene and propylene oxide of functionality approximately 2.0 and polytetramethylene glycol polymers of functionality about 2.0.

Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, adipic azelaic and the like acids with polyhydric alcohols such as ethylene glycol, butanediol, cyclohexanedimethanol and the like.

Illustrative of the amine-terminated polyethers are the aliphatic primary di-amines structurally derived from polyoxypropylene glycols. Polyether diamines of this type are available from Jefferson Chemical Company under the trademark JEFFAMINE.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595, or U.S. Pat. No. 4,631,329 cited supra and already incorporated herein.

Illustrative of the hydroxy-terminated polybutadiene copolymers are the compounds available under the trade name Poly BD Liquid Resins from Arco Chemical Company. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively.

Preferred diols are the polyether and polyester diols set forth above.

The difunctional extender employed can be any of those known in the TPU art disclosed above. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyldiethanolamine, and the like; and mixtures of any of the above. As noted previously, in some cases minor proportions (less than about 20 equivalent percent) of the difunctional extender may be replaced by trifunctional extenders without detracting from the thermoplasticity of the resulting TPU; illustrative of such extenders are glycerol, trimethylolpropane and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol and 1,4-cyclohexanedimethanol.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

The TPU forming ingredients can be reacted in organic solvents but are preferably reacted in the absence of solvent by melt-extrusion at a temperature of from about 125° C. to about 250° C., preferably from about 160° C. to about 225° C.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acids salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

If desired, the polyurethanes can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The modified polyolefin component defined above is represented by a large number of polyolefin random, block, and graft co-polymers which have long been known in the art and, for the most part, are commercially available. Otherwise they are readily prepared using the conventional techniques for polymerizing olefin monomers; see Preparative Methods of Polymer Chemistry, W. R. Sorenson and T. W. Campbell, 1961, Interscience Publishers, New York, N.Y. Illustrative but non-limiting of the basic olefin monomers for copolymerization with the functional group containing unsaturated monomers are ethylene, propylene, butylene, mixtures of ethylene/propylene, mixtures of ethylene/butylene, mixtures of propylene/butylene, mixtures of ethylene/$C_3$ to $C_{12}$ $\alpha,\beta$-unsaturated alkenes, and the like. Alternatively, the above illustrative monomers or mixtures are first polymerized to their corresponding polyolefins prior to grafting with said functional group containing monomers. A preferred class of modified polyolefin comprises a modified polyethylene, that is to say a polyethylene copolymer wherein the major molar proportion (at least 50 percent) of the copolymer consists of ethylene units copolymerized with at least one unsaturated monomer having a functional group substituent defined above, or a polyethylene (HDPE, LDPE or LLDPE) having grafted thereon a minor molar proportion (about 0.005 to 5 percent) of said at least one unsaturated monomer having the functional group substituent.

As illustrative embodiments of modified polyolefins in copolymer form are those derived from the copolymerization of any one of the olefin monomers set forth above but preferably ethylene in the minimum molar proportions of at least 50 percent with a vinyl functional group containing monomer such as acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, zinc acrylate, the ionic hydrocarbon polymers from the polymerization of $\alpha$-olefins with $\alpha,\beta$-ethylenically unsaturated carboxylic acids as described in U.S. Pat. No. 3,264,272 whose disclosure is incorporated herein by reference, and the like. It will be understood that in the case of the olefin/vinyl acid copolymers that the carboxylic acid groups can be wholly or partially converted to metal salts (i.e. sodium potassium, zinc) after formation of the copolymer. Such ionic copolymers are collectively recognized by the term "ionomers". The vinyl functional monomers can be used in combination. Furthermore, mixtures of any of these modified polyolefins can be used.

As illustrative embodiments of modified polyolefins in grafted form are those derived from the graft polymerization of any one of the vinyl functional group containing monomers set forth above (preferably maleic anhydride) onto any one of the olefin polymers set forth above but preferably polyethylene (HDPE, LDPE, LLDPE). The proportions of said graft monomers are preferably within the molar range of 0.005 to 5 percent set forth above. As with the copolymers above, mixtures or combinations can be employed. Further, the vinyl functional group containing monomers can be grafted onto the modified polyolefin copolymers discussed above. A preferred embodiment of such a polymer type includes the product obtained by grafting maleic acid or anhydride onto an ethylene/vinyl carboxylate copolymer or the saponified copolymer derived from ethylene/vinyl acetate. The graft-copolymerization of the unsaturated carboxylic acid or its functional derivative or another functional group-containing vinyl monomer onto the olefin polymer can be conducted using various methods. For example, the olefin polymer, the graft monomer and a free-radical initiator are mixed together and kneaded in a molten state. In another method, the graft monomer and a free-radical initiator are incorporated in a solution or suspension of the olefin polymer in a suitable solvent. It is also possible to conduct the graft copolymerization in the presence of the thermoplastic polyurethane elastomer, i.e., after being blended with the thermoplastic polyurethane elastomer.

It will be understood by those skilled in the art that the modified polyolefins can be prepared using any combination of monomer reactants in either a copolymer, grafted copolymer, or copolymer-grafted copolymer configuration. However, a most preferred class of modified polyolefin comprises a copolymer or graft copolymer of ethylene or polyethylene (particularly LDPE or LLDPE) with at least one vinyl monomer having a functional group selected from carboxylic acid, carboxylate salts, dicarboxylic acid or anhydride thereof, carboxylate ester, and acyloxy, and mixtures of said modified polyolefins. Particularly, preferred species of modified polyethylenes in this class are ethylene/vinyl acetate copolymer, ethylene/methylacrylate copolymer, ethylene/methacrylic acid copolymer, ethylene/acrylic acid copolymer, ethylene/maleic anhydride graft copolymer, maleic anhydride grafted ethylene/vinyl acetate copolymer, and mixtures thereof in any combination and proportions.

If desired, the blends or compositions in accordance with the present invention can have incorporated in them the illustrative additives set forth above either in addition to or instead of, being in the TPU ingredient. Alternatively, certain additives can be selected for inclusion in the TPU component at the time of its preparation while others can be incorporated if desired when the composition components are finally all brought together.

As previously noted, the present compositions allow for the incorporation of high levels of polyolefins in thermoplastic polyurethanes without separation or delamination of the individual components from molded or formed parts. In effect, this overcomes the barrier of incompatibility between polyethylene and thermoplastic polyurethanes. This achieves a most important objective in providing more economically attractive polymer materials by replacement of the more expensive TPU component with the polyolefin. However, in addition to this benefit another, and, surprising discovery is the overall retention of good physical properties in the blended compositions. Tensile strengths and elongation properties as measured on films prepared from the compositions maintain excellent levels attesting to the fact that the composition components remain compatible even after thermal forming steps.

Notably, it is in the area of film tear strengths and tensile strengths that the most surprising results are observed. Some of the films prepared from the compositions are characterized by a synergistic increase in strength values over those for the individual components. Accordingly, this makes the compositions eminently suited for the production of films. The films can be produced using any of the conventional means for converting polymer compositions to films, foils, and webs. Illustratively, the films can be produced by melt extrusion methods through the appropriately sized film die. Alternatively, the compositions can be dissolved in a suitable inert solvent. The term "inert solvent" means one that does not interact with any of the blend components or otherwise interfere with the foil forming process. Suitable solvents include dipolar aprotic solvents such as dimethylformamide, dimethylacetamide, dimethyl sulfoxide, acetonitrile, and the like; cyclohexanone, tetrahydrofuran, dioxane, acetone, methylethyl ketone, and mixtures thereof. The solids content is not critical and can be typically from about 5 to about 25 percent in the solvent. Films can be cast from the solutions and doctor-knifed to the appropriate thickness onto glass, or metal substrates. Solvent removal is readily accomplished by known heating (50° C. to 250° C.) cycles under atmospheric or vacuum pressures (0.01 to 50 mm mercury pressure). Additionally, the solutions can be used for coatings, adhesives, etc. by spreading, dipping, brushing, spraying, and like means for application.

The compositions in accordance with this invention are soft, flexible resinous compositions of high tensile and tear resistance with good processability and good adhesion to a wide variety of plastics. Accordingly, they can find utility in coating leather, fabric coating for upholstery, rainwear, sportswear, adhesives for leather to vinyl, foam to vinyl, ABS, etc; for surgical gloves; plastic laminating, and the like.

The following examples describe the manner and process of making and using the invention and set forth the best mode contemplated by the inventor of carrying out the invention but are not to be construed as limiting.

EXAMPLE 1

This experiment described the preparation of a blended composition in accordance with the present invention (blend 1) and the formation of a film therefrom. Six comparison compositions containing either a sole ingredient of one of the invention blend components or 50/50 w/w combinations thereof are also prepared and made into films. The weight proportions of the components for the comparison blends and invention blend 1 are selected so that the samples contain the weight percentages of the ingredients set forth in Table I.

The thermoplastic polyurethane (TPU) component is prepared by melt-extruding the following ingredients in the proportions by weight set forth below in accordance with the preparative method set forth in U.S. Pat. No. 3,642,964: 31.15 parts (3.07 equiv.) of 4,4'-methylenebis(phenyl isocyanate), 50.12 parts (0.62 equiv.) of a 2,000 molecular weight polybutylene adipate diol, 10.75 parts (0.38 equiv.) of a 700 molecular weight polybutylene adipate diol, 7.28 parts (2.0 equiv.) of 1,4-butanediol, 0.22 part (0.01 equiv.) of stearyl alcohol, 0.04 wt. percent of stannous octoate (50/50 in dioctyl phthalate), 0.2 wt. percent of Carnuba wax, and 0.25 wt. percent BHT antioxidant; Shore A hardness about 80.

In the case of comparison blends 4 to 6 and blend 1 of the invention the respective components set forth in Table I in granule or powder form are thoroughly mixed by tumble blending them together in a container. The individual components in the case of comparison samples 1 to 3 and the blends in the case of comparison samples 4 to 6 and blend 1 of the invention are fed to a 1 inch extruder fitted with a 24/1 length to diameter screw with a 3:1 compression ratio. Extrusion conditions are as follows; temperatures: feed zone=320° F.; melting zone=360° F.; metering zone=370° F.; die=380° F.; r.p.m.=50. The extruder is directly attached to an annular 1 inch diameter die; polymer melt exiting the extruder is radially distributed into a tubular stream to form continuous seamless tubing. This tubing is vertically extruded and inflated with air supplied through a central channel in the die center. Sufficient air is supplied to inflate the tubing to provide a layflat width of film of 5.75 inches after the tubing has exited two nip rolls operating at a speed and width to result in a 2 mil film thickness.

The resulting films after curing for at least 24 hours at 72° F. and 50% relative humidity are tested for the physical properties set forth in Table I. The tear strength of blend 1 of the invention is substantially higher than the tear strengths of the individual components of the blend (comparisons 1 to 3) and the 50/50 weight percent mixtures of the respective components in the comparison blends 4 to 6. Also, the tensile strength of invention blend 1 is substantially higher than the values of either one of the 50/50 blends containing the TPU component (i.e. comparison blends 4 and 6). The film sample of comparison blend 4 has visual evidence of separation.

TABLE I

| Blend | Comp. 1 | Comp. 2 | Comp. 3 | Comp. 4 | Comp. 5 | Comp. 6 | #1 |
|---|---|---|---|---|---|---|---|
| Components (wt. %) | | | | | | | |
| LLDPE[1] | 100% | — | — | 50 | 50 | — | 16 |
| TPU-I[2] | — | 100% | — | 50 | — | 50 | 67 |
| Modified PE-I[3] | — | — | 100% | — | 50 | 50 | 16 |
| Physical Properties: | | | | | | | |
| Tensile str. (psi)[4] | 4595 | 8452 | 5750 | 4230 | — | 6000 | 7600 |
| Tear str. (gms/mil)[5] | 460 | 500 | 65 | 510 | 215 | 450 | 660 |
| Elongation (%) | | | | | | | |
| Machine Direction | 675 | 570 | 375 | 563 | 540 | 400 | 590 |

Footnotes to Table I
[1] LLDPE: A linear low density polyethylene (density=0.912 gms/cc) supplied by The Dow Chemical Company under the name AT-TANE™ 4001.
[2] TPU-I: Thermoplastic polyurethane whose preparation is described above in this example.
[3] Modified PE-I: This is a ternary blend of modified polyethylenes supplied by Du Pont Chemical Company under the name Bynel CX-3101 and contains (a) about 20 percent by weight of a maleic anhydride graft (about 1 percent w/w) on high density polyethylene; (b) about 40 percent by weight of an ethylene/vinyl acetate (about 50 percent w/w) copolymer; and (c) about 40 percent by weight of an ethylene/methacrylic acid (about 5 percent w/w) copolymer.
[4] These values of tensile strength in psi as measured by ASTM Test Method D882 represents the average of two values determined in machine direction and transverse direction of film preparation.
[5] Tear strength is Elmendorf Tear strength measured in gms/mil in accordance with ASTM D-1922 in the machine direction of the sample.

EXAMPLE 2

This experiment describes the preparation of three blended compositions (2 to 4) in accordance with the present invention as well as comparison blends 7 and 8 and the preparation of films from the blends.

The procedure is identical to Example 1 above and the blend components are in the proportions in parts by weight to provide the weight percentages set forth in Table II below. The tensile strengths and tear strengths of the blends 2 and 3 are superior to those of the comparison blends 7 and 8 wherein just the urethane and polyethylene components are present. In this connection, the properties of blend 3 are somewhat superior to those of blend 2 signifying the preference for a linear low density polyethylene component over the low density polyethylene employed in blend 2.

Blend 4 of the invention contains the percentages of individual modified polyethylene components (II) to (IV) rather than the already ternary blend of PE-I employed in blends 2 and 3. Physical property results are good. Film samples of comparison blends 7 and 8 show visual evidence of separation.

TABLE II

| Blend | #2 | Comp. 7 | #3 | Comp. 8 | #4 |
|---|---|---|---|---|---|
| Components (wt. %) | | | | | |
| LDPE[1] | 16 | 70 | — | — | — |
| LLDPE[2] | — | — | 16 | 50 | — |
| LLDPE[3] | — | — | — | — | 17 |
| TPU-II[4] | 67 | 30 | 67 | 50 | — |
| TPU-I[5] | — | — | — | — | 67 |
| Modified PE-I[6] | 16 | — | 16 | — | — |
| Modified PE-II[7] | — | — | — | — | 10 |
| Modified PE-III[8] | — | — | — | — | 3 |
| Modified PE-IV[9] | — | — | — | — | 4 |
| Physical Properties: | | | | | |
| Tensile str. (psi) | 5250 | 3000 | 6300 | 4375 | 6708 |
| Tear str. (gms/mil) | 610 | 50 | 740 | 725 | 630 |
| Elongation (%) | 500 | 450 | 600 | 550 | 425 |

Footnotes to Table II
[1] LDPE: A low density polyethylene (density=0.922 gms/cc) supplied by The Dow Chemical Company under the name PE-535.
[2] LLDPE: A linear low density polyethylene (density=0.920 gms/cc) supplied by The Dow Chemical Company under the name LLDPE 2045.
[3] LLDPE: The same linear low density polyethylene identified in footnote 1 to Table I.
[4] TPU-II: This thermoplastic polyurethane is prepared identically to TPU-I described in Example 1 but employing the following ingredients expressed in equivalents: 1 equiv. of the 2,000 molecular weight polybutylene adipate diol, 2.8 equiv. of 1,4-butanediol, 0.2 equiv. of dipropylene glycol, 0.1 equiv. of butylcarbitol, 4.05 equiv. of 4,4'-methylenebis(-phenyl isocyanate), 0.04 wt. percent of the stannous octoate, 0.15 wt. percent Advawax 280, 0.35 weight percent E-wax, and 0.15 wt. percent antioxidant I-1010; Shore A hardness about 80.
[5] TPU-I: Identical to TPU-I discussed in Example 1 above.
[6] Modified PE-I: Identical to PE-I defined in footnote 3 of Table I.
[7] Modified PE-II: An ethylene/vinyl acetate (25 percent by weight) copolymer supplied by Du Pont Chemical Company as Elvax 3190.
[8] Modified PE-III: An ethylene/methacrylic acid (9 percent by weight) copolymer supplied by Du Pont Company under the name Nucrel™ 0903.
[9] Modified PE-IV: A ethylene/maleic anhydride (0.12 wt. percent) graft copolymer on a linear low density polyethylene.

EXAMPLE 3

This experiment describes the preparation of four blend compositions (5 to 8) in accordance with the present invention and the preparation of films from the blends.

The procedure is identical to Example 1 above and the blend components are in the proportions in parts by weight to provide the weight percentages set forth in Table III.

A comparison of the tensile strengths of blends 5 to 7 shows an increase as the vinyl acetate component of the modified polyethylene increases from 18 to 28 percent by weight but without effect on the elongation properties. A noteworthy observation in respect of blend 8 is the exceptionally high level of polyethylene with low TPU content while still retaining excellent properties with no signs of delamination or component separation.

TABLE III

| Blend | #5 | #6 | #7 | #8 |
|---|---|---|---|---|
| Components (wt. %) | | | | |
| LLDPE[1] | 20 | 20 | 20 | 60 |
| TPU-I[2] | 60 | 60 | 60 | — |
| TPU-II[3] | — | — | — | 20 |
| Modified PE-II[4] | — | 12 | — | — |
| Modified PE-III[5] | 4 | 4 | 4 | 4 |
| Modified PE-IV[6] | 5 | 5 | 5 | 5 |
| Modified PE-V[7] | 12 | — | — | — |
| Modified PE-VI[8] | — | — | 12 | 12 |
| Physical Properties | | | | |
| Tensile str. (psi) | 6388 | 7732 | 9265 | 5311 |
| Tear str. (gms/mil) | 900 | 750 | 870 | — |

TABLE III-continued

| Blend | #5 | #6 | #7 | #8 |
|---|---|---|---|---|
| Elongation (%) | 525 | 500 | 525 | 575 |

Footnotes to Table III
[1]LLDPE: This is the linear low density polyethylene described in Example 1 as ATTANE ™ 4001.
[2]TPU-I: The thermoplastic polyurethane described in Example 1.
[3]TPU-II: The thermoplastic polyurethane described in footnote 4 of Table II.
[4]PE-II: The modified polyethylene described in footnote 7 of Table II.
[5]PE-III: The modified polyethylene described in footnote 8 of Table II.
[6]PE-IV: The modified polyethylene described in footnote 9 of Table II.
[7]PE-V: An ethylene/vinyl acetate (18 percent by weight) copolymer supplied by Du Pont Chemical Company as Elvax 3170.
[8]PE-VI: An ethylene/vinyl acetate (28 percent by weight) copolymer supplied by Du Pont Chemical Company as Elvax 3175.

EXAMPLE 4

This experiment describes the preparation of four blended compositions (9 to 12) in accordance with the present invention and the preparation of films from the blends.

The procedures and polymer ingredients similar to those set forth above but including two further modified polyethylenes are used in this experiment. The proportions employed are such that the component weight percentages are those set forth in Table IV.

An ethylene/vinyl acetate copolymer can serve as a compatibilizer by itself. Further improvements particularly in tensile strength are observed when the modified polyolefin component contains a minor amount of acrylic acid comonomer.

TABLE IV

| Blend | #9 | #10 | #11 | #12 |
|---|---|---|---|---|
| Components (wt. %) | | | | |
| LLDPE[1] | 17 | 20 | 20 | 20 |
| TPU-I[2] | 67 | — | — | — |
| TPU-II[3] | — | 60 | 60 | 50 |
| Modified PE-II[4] | 16 | — | — | 15 |
| Modified PE-VII[5] | — | 20 | — | — |
| Modified PE-VIII[6] | — | — | 20 | 15 |
| Physical Properties | | | | |
| Tensile str. (psi) | 6162 | 6254 | 8714 | 7767 |
| Tear str. (gms/mil) | 343 | — | — | — |
| Elongation (%) | 425 | 525 | 500 | 475 |

Footnotes to Table IV
[1]LLDPE: Same LLDPE described in Example 1.
[2]TPU-I: Same TPU described in Example 1.
[3]TPU-II: Same TPU described in Example 2.
[4]PE-II: Same modified polyethylene described in footnote 7 of Table II.
[5]PE-VII: A maleic anhydride grafted ethylene/vinyl acetate copolymer supplied by Quantum Chemical Corporation under the name of Plexar ™ 3.
[6]PE-VIII: An ethylene/acrylic acid (about 9 wt. %) copolymer supplied by The Dow Chemical Company under the name PRIMACOR ™ 1410.

EXAMPLE 5

This experiment describes the preparation of two blended compositions (13 and 14) in accordance with the present invention and the preparation of films from the blends. A comparison blend 9 is also prepared.

The same procedure described in Example 1 is employed and the blend components are in the proportions in parts by weight to provide the weight percentages set forth in Table V. In the preparation of these three blends a thermoplastic polyurethane based on a cycloaliphatic diisocyanate is employed (namely TPU-III). It is prepared using the same procedure set forth in Example 1 for TPU-I but employing the following ingredients: one equivalent of a 2,000 molecular weight polypropyleneoxy-ethyleneoxy capped diol, 4.0 equivalents of 4,4'-methylenebis(cyclohexyl isocyanate), 3.0 equivalents of 1,4-butanediol, and 0.05 weight percent stannous octoate, plus 0.10 weight percent of a wax lubricant; a 2.0 mil film has a Shore A hardness of about 80.

Both blended samples 13 and 14 have excellent strengths and elongation, retaining the best properties of the comparison 9 sample of the straight TPU-III and gaining the good elongation property of the LLDPE component as seen from the data for the comparison 1.

TABLE V

| Blend | #13 | #14 | Comp. 9 | Comp. 1 |
|---|---|---|---|---|
| Components (wt. %) | | | | |
| LLDPE[1] | 20 | 20 | — | 100 |
| TPU-III | 60 | 60 | 100 | — |
| Modified PE-II[2] | — | 12 | — | — |
| Modified PE-III[3] | 4 | 4 | — | — |
| Modified PE-IV[4] | 4 | 4 | — | — |
| Modified PE-VI[5] | 12 | — | — | — |
| Physical Properties | | | | |
| Tensile str. (psi) | 6326 | 6310 | 7200 | 4595 |
| Tear str. (gms/mil) | — | — | — | 460 |
| Elongation (%) | 631 | 658 | 467 | 675 |

Footnotes to Table V
[1]LLDPE: Same as LLDPE described in Example 1.
[2]PE-II: Described in footnote 7 of Table II.
[3]PE-III: Described in footnote 8 of Table II.
[4]PE-IV: Described in footnote 9 of Table II.
[5]PE-VI: Described in footnote 8 of Table III.

What is claimed is:

1. A thermoplastic compatible blended composition comprising A. from about 15 to about 60 weight percent of a polyolefin, B. from about 30 to about 70 weight percent of a thermoplastic polyurethane, and C. from about 10 to about 35 weight percent of at least one modified polyolefin defined as a random, block or graft olefin copolymer having in a main or side chain thereof a functional group selected from the class consisting of carboxylic acid, carboxylate ester, carboxylic acid anhydride, carboxylate salts, amide, epoxy, hydroxy, and acyloxy.

2. A composition according to claim 1 wherein said polyolefin (A) comprises polyethylene.

3. A composition according to claim 2 wherein said polyethylene is selected from the group consisting of low density polyethylene and linear low density polyethylene.

4. A composition according to claim 1 wherein said thermoplastic polyurethane is derived from the reaction of an organic diisocyanate, at least one polymeric diol, and at least one difunctional extender.

5. A composition according to claim 1 wherein said at least one modified polyolefin is a modified polyethylene.

6. A composition according to claim 5 wherein said modified polyethylene comprises a copolymer or graft copolymer of ethylene or polyethylene respectively with at least one vinyl monomer having a functional group selected from the class consisting of carboxylic acid, carboxylate salts, dicarboxylic acid or anhydride thereof, carboxylate ester and acyloxy, or mixtures of said modified polyethylenes.

7. A thermoplastic compatible composition comprising on a 100 weight percent basis:
   A. from about 15 to about 60 percent linear low density polyethylene;
   B. from about 30 to about 70 percent of a polyurethane derived from the reaction of an organic diisocyanate, a polymeric diol; and a difunctional extender; and C. from about 10 to about 35 percent of a modified polyethylene selected from the group consisting of ethylene/vinyl acetate copolymer, ethylene/methylacrylate copolymer, ethylene/methacrylic acid copolymer, ethylene/acrylic acid copolymer, ethylene/maleic anhydride graft copolymer, maleic anhydride grafted ethylene/vinyl acetate copolymer, and mixtures thereof in any combination.

8. A composition according to claim 7 wherein said polyurethane (B) is derived from 4,4'-methylenebis(cyclohexyl isocyanate), a 2,000 molecular weight polyethyleneoxy capped polypropyleneoxy diol, and 1,4-butanediol.

9. A composition according to claim 8 wherein said (C) comprises a mixture of ethylene vinyl acetate copolymer, ethylene methacrylic acid copolymer, and ethylene maleic anhydride graft copolymer.

10. A composition according to claim 7 wherein said polyurethane (B) is derived from 4,4'-methylenebis(phenyl isocyanate), a blend of a 2,000 and 700 molecular weight polybutylene adipate diol, and 1,4-butanediol.

11. A composition according to claim 10 wherein said (C) comprises a mixture of ethylene/vinyl acetate copolymer, ethylene/methacrylic acid copolymer, and ethylene/maleic anhydride graft copolymer.

12. A composition according to claim 10 wherein said (C) comprises ethylene/vinyl acetate copolymer.

13. A composition according to claim 10 wherein said (C) comprises maleic anhydride grafted ethylene/vinyl acetate copolymer.

14. A composition according to claim 10 wherein said (C) comprises ethylene/acrylic acid copolymer.

15. A composition according to claim 10 wherein said (C) comprises a mixture of ethylene/vinyl acetate copolymer and ethylene/acrylic acid copolymer.

16. A film prepared from a thermoplastic compatible composition in accordance with claim 1.

* * * * *